(12) United States Patent
MacCagnan

(10) Patent No.: US 8,840,389 B2
(45) Date of Patent: Sep. 23, 2014

(54) EXTRUSION DEVICE IN PARTICULAR FOR PLASTIC MATERIALS

(75) Inventor: Giorgio MacCagnan, Castronno (IT)

(73) Assignee: Gimac di Maccagnan Giorgio, Castronno (IT)

( * ) Notice: Subject to any disclaimer, the term of this patent is extended or adjusted under 35 U.S.C. 154(b) by 0 days.

(21) Appl. No.: 13/991,102

(22) PCT Filed: Dec. 13, 2010

(86) PCT No.: PCT/IT2010/000499
§ 371 (c)(1),
(2), (4) Date: May 31, 2013

(87) PCT Pub. No.: WO2012/081042
PCT Pub. Date: Jun. 21, 2012

(65) Prior Publication Data
US 2013/0251833 A1    Sep. 26, 2013

(51) Int. Cl.
| B29C 47/04 | (2006.01) |
| B29C 47/20 | (2006.01) |
| B29C 47/24 | (2006.01) |
| B29C 47/06 | (2006.01) |
| B29C 47/28 | (2006.01) |
| B29C 47/00 | (2006.01) |
| B29C 47/56 | (2006.01) |

(52) U.S. Cl.
CPC ..... B29C 47/062 (2013.01); B29C 2947/92885 (2013.01); B29C 47/0023 (2013.01); B29C 2947/92904 (2013.01); B29C 47/56 (2013.01); B29C 2947/9259 (2013.01); B29C 47/24 (2013.01); B29C 47/28 (2013.01); B29C 2947/92514 (2013.01)
USPC ............ 425/132; 425/380; 425/462; 425/467

(58) Field of Classification Search
CPC .............. B29C 47/062; B29C 47/0816; B29C 47/0874; B29C 47/0876; B29C 47/128; B29C 47/24; B29C 47/268; B29C 47/28; B29C 47/56; B29C 2947/92514; B29C 2947/92904
USPC .................... 425/132, 380, 462, 467
See application file for complete search history.

(56) References Cited

U.S. PATENT DOCUMENTS

| 4,276,250 A * | 6/1981 | Satchell et al. ............... 264/167 |
| 4,888,146 A * | 12/1989 | Dandeneau ............. 264/173.16 |
| 2006/0066060 A1 | 3/2006 | Reineke |
| 2009/0074899 A1 | 3/2009 | Lipson |

FOREIGN PATENT DOCUMENTS

| EP | 0726133 A1 | 8/1996 |
| JP | 52000962 A | 1/1977 |
| JP | 62 216705 A | 9/1987 |

OTHER PUBLICATIONS

Database WPI Week 197707 Thomson Scientific, London, Great Britain, AN 1977-12075Y, XP000002657988, 1977, 1 page.

* cited by examiner

Primary Examiner — Yogendra Gupta
Assistant Examiner — Joseph Leyson
(74) Attorney, Agent, or Firm — Pearne & Gordon LLP

(57) ABSTRACT

An extrusion device, in particular for plastic materials comprising: an extrusion head (2) having a nozzle (2a) for ejection of at least one plastic material (M1, M2); a first duct (5) formed in said head (2) for feeding a first plastic material (M1) to said ejection nozzle (2a); a second duct (β) formed in said head (2) for feeding a second plastic material (M2) to said ejection nozzle (2a); and a selection element (8), disposed in the vicinity of said ejection nozzle (2a) and able to be switched between a first operating condition at which it closes the second duct (6) to enable feeding of the first plastic material (M1) through the first duct (5), and a second operating condition at which it closes the first duct (5) to enable feeding of the second plastic material (M2) through the second duct (6).

6 Claims, 5 Drawing Sheets

EXTRUSION DEVICE IN PARTICULAR FOR PLASTIC MATERIALS

The present invention relates to an extrusion device, in particular for plastic materials.

In greater detail, the present invention concerns a device for making a tubular body by extrusion of two materials different from each other, respectively disposed in an alternate manner on the tubular body. In other words, the present invention is particularly used for alternately extruding two plastic materials different from each other, in such a manner as to constitute a continuous tubular body.

It is known that the extrusion devices are made up of an extrusion head defining a respective ejection nozzle for the molten plastic materials.

The nozzle has a substantially annular extension, adapted to define the tubular shape of the finished product. In order to maintain the hollow structure of the finished product, a blowing duct is used which is disposed centrally of the annular nozzle and is adapted to supply air to the inside of the materials while they are being extruded from the nozzle. In addition, the nozzle is in communication with two ducts for distribution of the respective molten plastic materials.

In particular, the head generally consists of two annular bodies coaxial to each other and each of them defining a passage duct for the respective molten plastic material.

Both ducts are provided with respective selection devices, designed to enable or inhibit delivery of the material to said nozzle. These selection devices consist of valves that can be switched between an operating condition at which they allow passage of the plastic material and a non-operating condition at which they obstruct the respective duct.

By a suitable combined activation of the valves, an alternate delivery of the two materials present in said ducts is allowed. In this way, extrusion of a first material is alternated with that of a second material so that a tubular product of composite material is obtained.

The above described known devices however have some important drawbacks. These drawbacks are specifically connected with the complex and particularly bulky structure of the selection devices for delivery of the plastic material.

In fact, as mentioned above, each duct is provided with a respective valve that must be suitably operated by respective control members which too are disposed at the extrusion head. As a result, each valve determines a particular bulkiness at the respective duct. In addition, the two valves must be suitably synchronised for alternating delivery of the two materials, which involves use of complicated management programs for said valves.

A further drawback is represented by the formation of plastic material residues in the duct stretch defined between the respective valves and the ejection nozzle. In fact, in the condition in which a valve obstructs the duct, the material remaining in the duct upstream of the nozzle tends to stop inside this duct stretch. This drawback appears to be of particular importance, taking into account the distance between each valve and the nozzle. In fact, it is to be considered that the sizes of said valves inhibit positioning of same close to the nozzle. For this reason, the duct stretch bringing the valve into fluid communication with the nozzle must be particularly extended, thereby giving rise to formation of an important amount of material residues.

Another drawback present in known devices is the flow resistance in the alternate supply of the two materials. In fact, the thrust pressures of the molten material within the ducts are submitted to important variations due to the continuous interruption of each duct. Therefore, as a result, there is a flow resistance adversely affecting the constant delivery of the two materials that are not extruded in a homogeneous manner.

In this context, the technical task underlying the present invention is to propose an extrusion device, in particular for plastic materials, overcoming the aforesaid drawbacks of the known art.

In particular, the present invention aims at making available an extrusion device having a reduced bulkiness and simple structure.

It is a further aim of the invention to propose an extrusion device capable of eliminating a possible flow resistance due to an alternate delivery of two different materials.

The technical task mentioned and the aims specified are substantially achieved by an extrusion device in particular for plastic materials, comprising the technical features set out in one or more of the appended claims.

Further features and advantages of the present invention will become more apparent from the description given by way of non-limiting example of a preferred but not exclusive embodiment of an extrusion device, as shown in the accompanying drawings, in which.

Figure 1A:
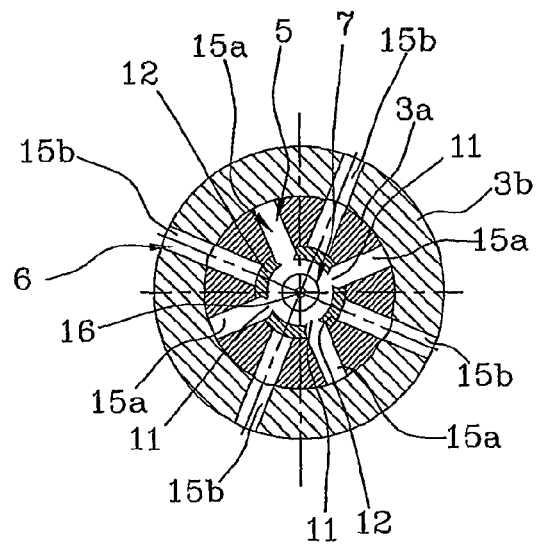
FIG. 1a is a cross-sectional view of the extrusion device in FIG. 1.

Referring particularly to the drawings, an extrusion device in accordance with the present invention has been generally identified by reference numeral 1.

In detail, device 1 comprises an extrusion head 2 provided on the lower part thereof with an ejection nozzle 2a for delivery of at least one plastic material M1, M2 to be extruded.

Figure 1:
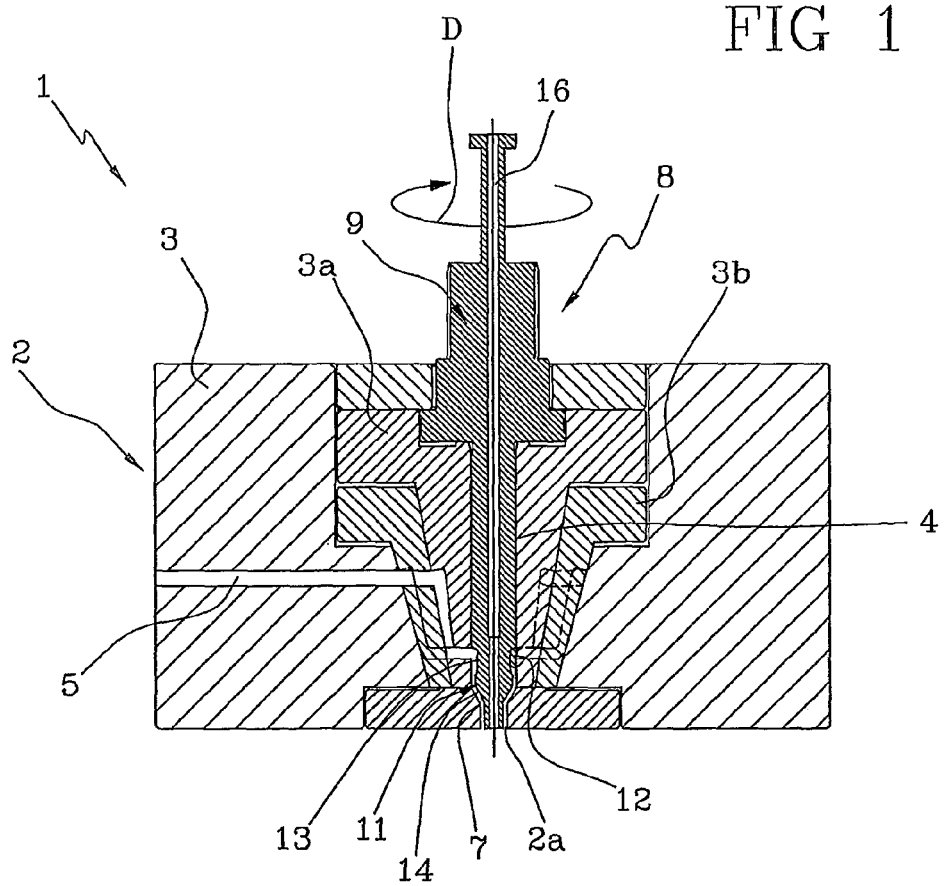
FIG. 1 is a longitudinal section view of an extrusion device according to the present invention, in a first operating condition.
Figure 2A:
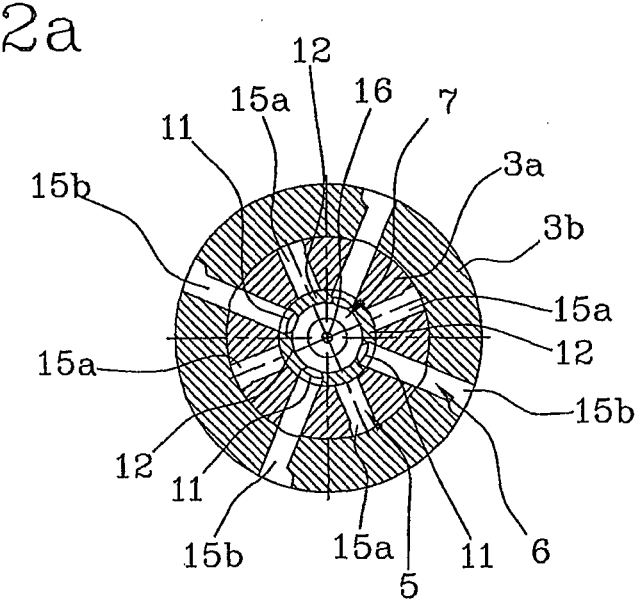
FIG. 2a is a cross-sectional view of the extrusion device in FIG. 2.
Figure 2:
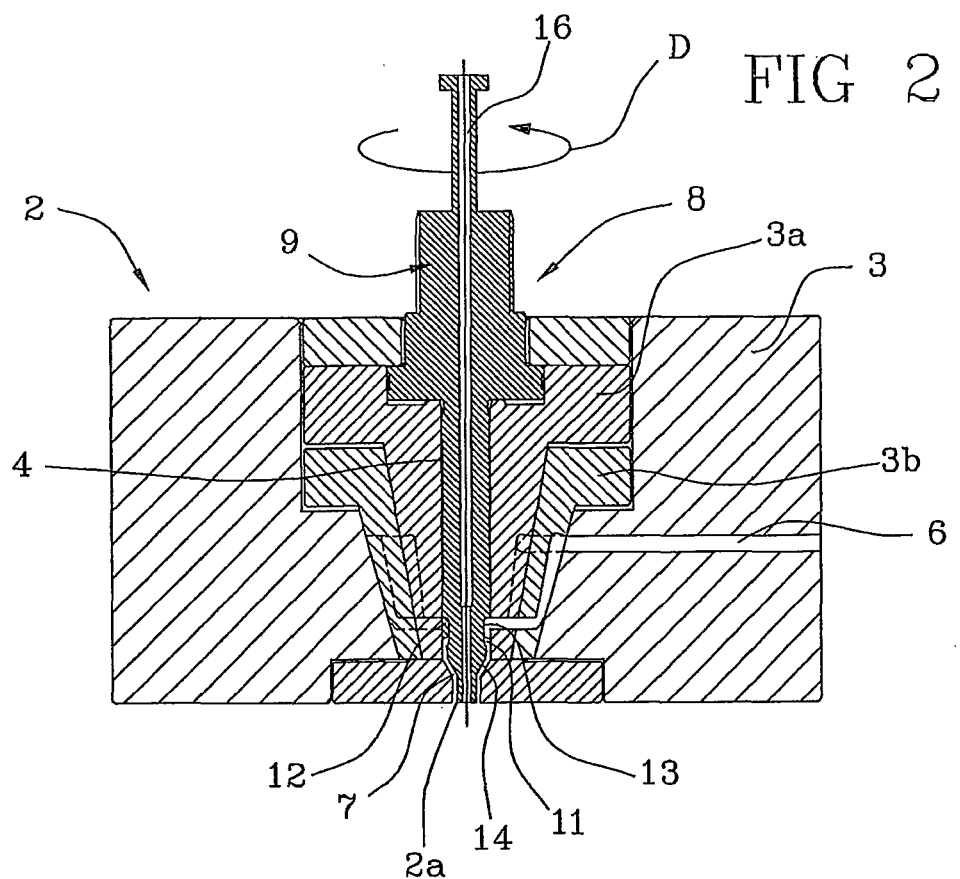
FIG. 2 is a longitudinal section view of the extrusion device of the invention in a second operating condition.

With reference in particular to FIGS. 1 and 2, it should be noted that the head 2 has a supporting body 3 for a pair of annular portions 3a, 3b mutually coaxial and inserted into each other. The innermost annular portion 3a has a longitudinal cavity 4 defining said ejection nozzle 2a at a respective end thereof. Note that each annular portion 3a, 3b in cooperation with said supporting body 3 defines a respective duct for passage of the plastic material to be extruded.

In particular, as shown in FIG. 1, the innermost annular portion 3a has a first duct 5 for feeding a first plastic material M1 to the ejection nozzle 2a.

Shown in FIG. 2 is, on the contrary, a second duct 6 formed in the outermost annular portion 3b and adapted to feed a second plastic material M2 to said nozzle 2a.

It should be pointed out that ducts 5, 6 are suitably connected to delivery means of the materials M1 and M2, not shown as of known type, adapted to feed said materials M1 and M2 to a predetermined pressure. Also provided is suitable heating means, not described or shown because it is not part of the present invention, this means being designed to heat the plastic materials M1 and M2 so as to always maintain them to a liquid state.

The first and second ducts 5, 6 have a common or shared end stretch 7 close to the ejection nozzle 2a for extruding both materials M1 and M2 through the nozzle 2a itself.

In detail, the common stretch is formed in a selection element 8 disposed in the vicinity of the ejection nozzle 2a and able to be switched between a first operating condition (FIGS. 1, 1a and 4) in which it obstructs the second duct 6 to allow feeding of the first plastic material M1 through the first duct 5, and a second operating condition (FIGS. 2, 2a and 5) in which it obstructs the first duct 5 to allow feeding of the second plastic material M2 through the second duct 6.

In this manner, the selection element 8 alternates feeding of the first material M1 with feeding of the second material M2 to the nozzle, thus obtaining an alternate feeding of two different materials.

For the sake of a more precise description it should be pointed out that the present invention enables the operating state of the selection element 8 to be switched over in such a manner that:

in the "first operating condition" the second duct 6 is obstructed and simultaneously the first duct 5 is opened, so that feeding of the first plastic material M1 through the first duct 5 is allowed but simultaneously feeding of the second plastic material M2 through the second duct 6 is inhibited; and vice versa in the "second operating condition" the first duct 5 is obstructed and simultaneously the second duct 6 is opened, so that feeding of the second plastic material M2 through the second duct 6 is allowed but simultaneously feeding of the first plastic material M1 through the second duct 5 is inhibited.

In order to enable regular supply of the first and second materials to the ejection nozzle 2a, the first and second ducts 5, 6 comprise a shared or common end stretch 7 which is placed in the vicinity of the ejection nozzle 2a (as better explained in the following) and is formed in the selection element 8: this common end stretch 7 is therefore exclusively taken up, during the different work steps of device 1, by the first plastic material M1 (at the first operating condition of the selection element 8) or, on the contrary, it is exclusively taken up by the second plastic material M2 (at the second operating condition of the selection element 8).

The modalities for managing flowing of materials M1 and M2 in mutual alternation and simultaneous exclusion (in terms of passage through nozzle 2a) therefore allow a single extruded body P to be defined which is divided into a plurality of segments individually formed with the first material M1 or the second material M2 along an extrusion axis; advantageously, being the shared end stretch 7 relatively short, a very short transient time is required for the material passing through nozzle 2a to change from M1 to M2 (or vice versa), so that extremely short "regions of material transition" can be obtained along the extrusion axis of the single body P.

In more details in terms of structure, the selection element 8 comprises a substantially cylindrical body 9 rotatably inserted in the cavity 4 of the extrusion head 2.

Figure 3:
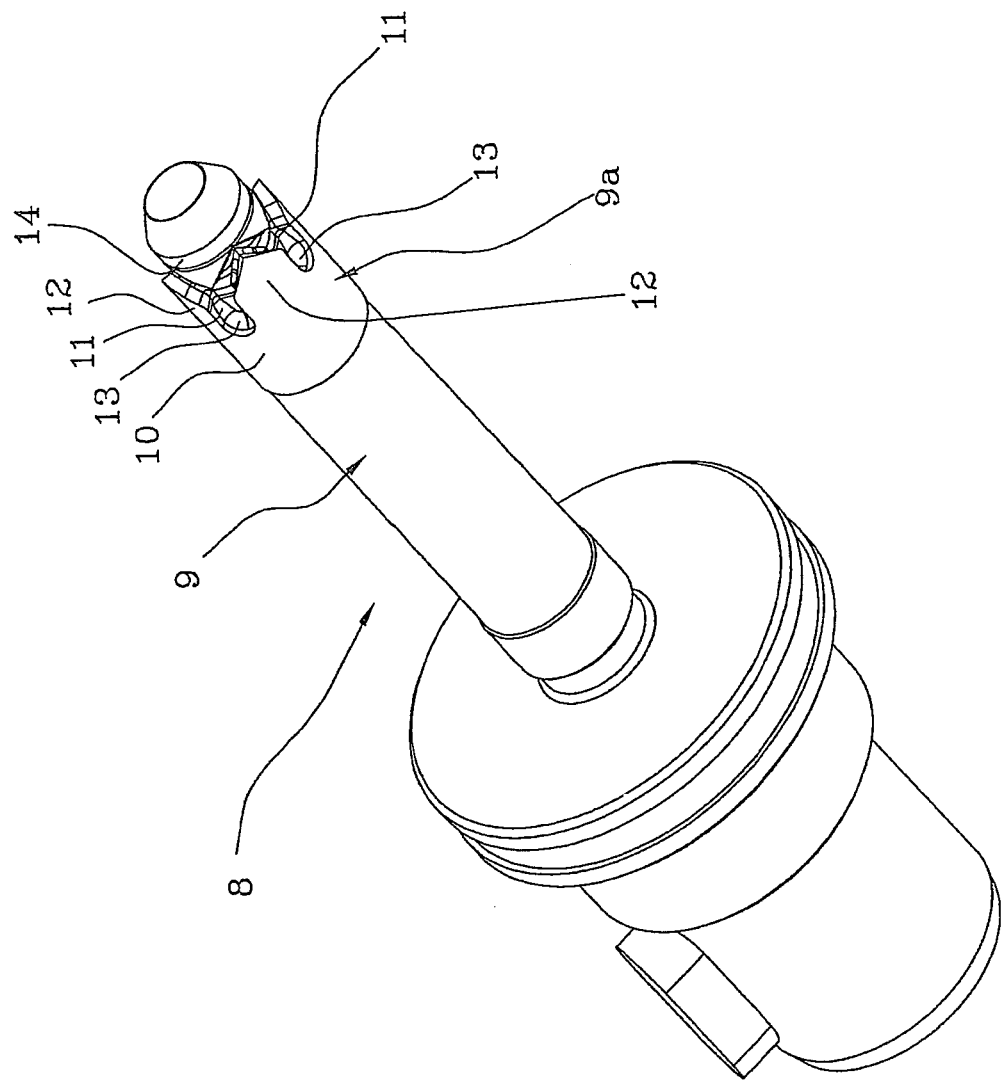
FIG. 3 is a perspective view of a construction detail of the extrusion device according to the present invention.

Referring particularly to FIG. 3, in which only the cylindrical body 9 is shown in detail, it is possible to see that this cylindrical body 9 has a cylindrical outer wall 10 placed at an end 9a of body 9 close to said nozzle 2a. Formed on the outer wall 10 is at least one groove 11 which in cooperation with the inner walls of cavity 4, defines said shared end stretch 7.

Figure 4:
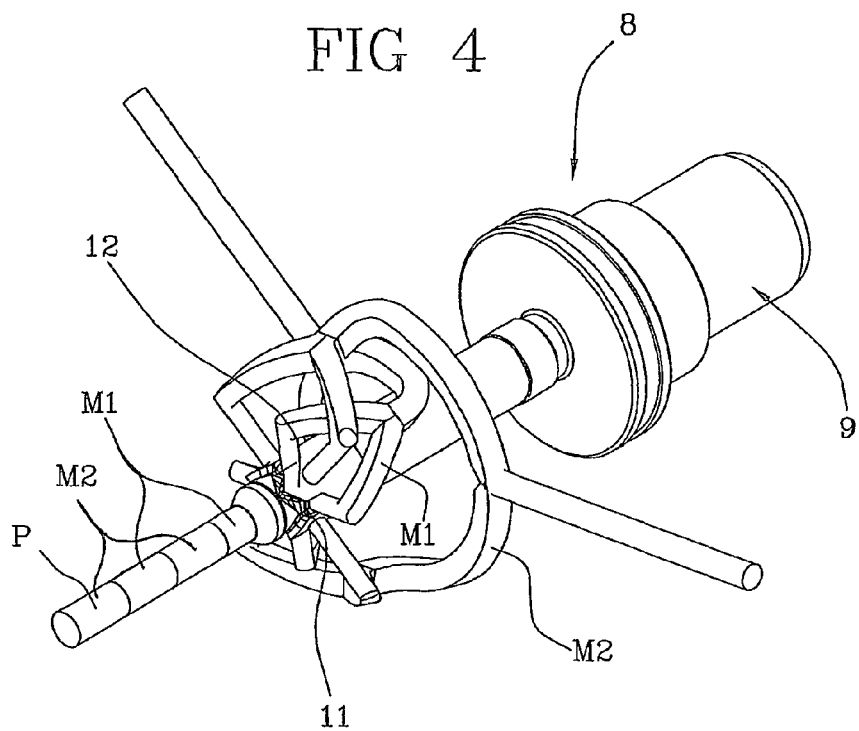
FIGS. 4 and 5 are perspective views of the construction detail of FIG. 3, in respective operating conditions.
Figure 5:
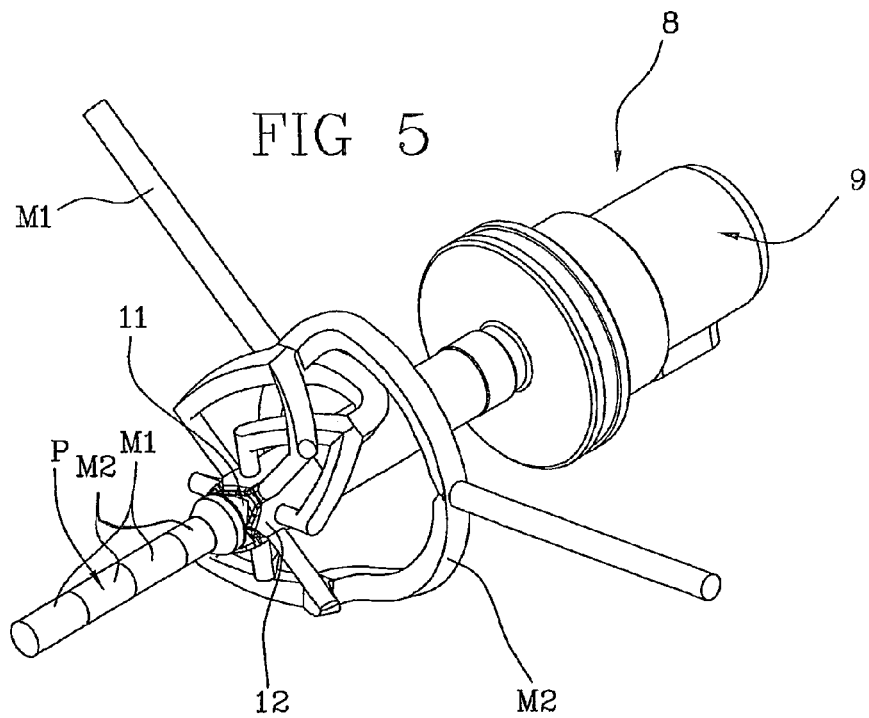
Figure 6:
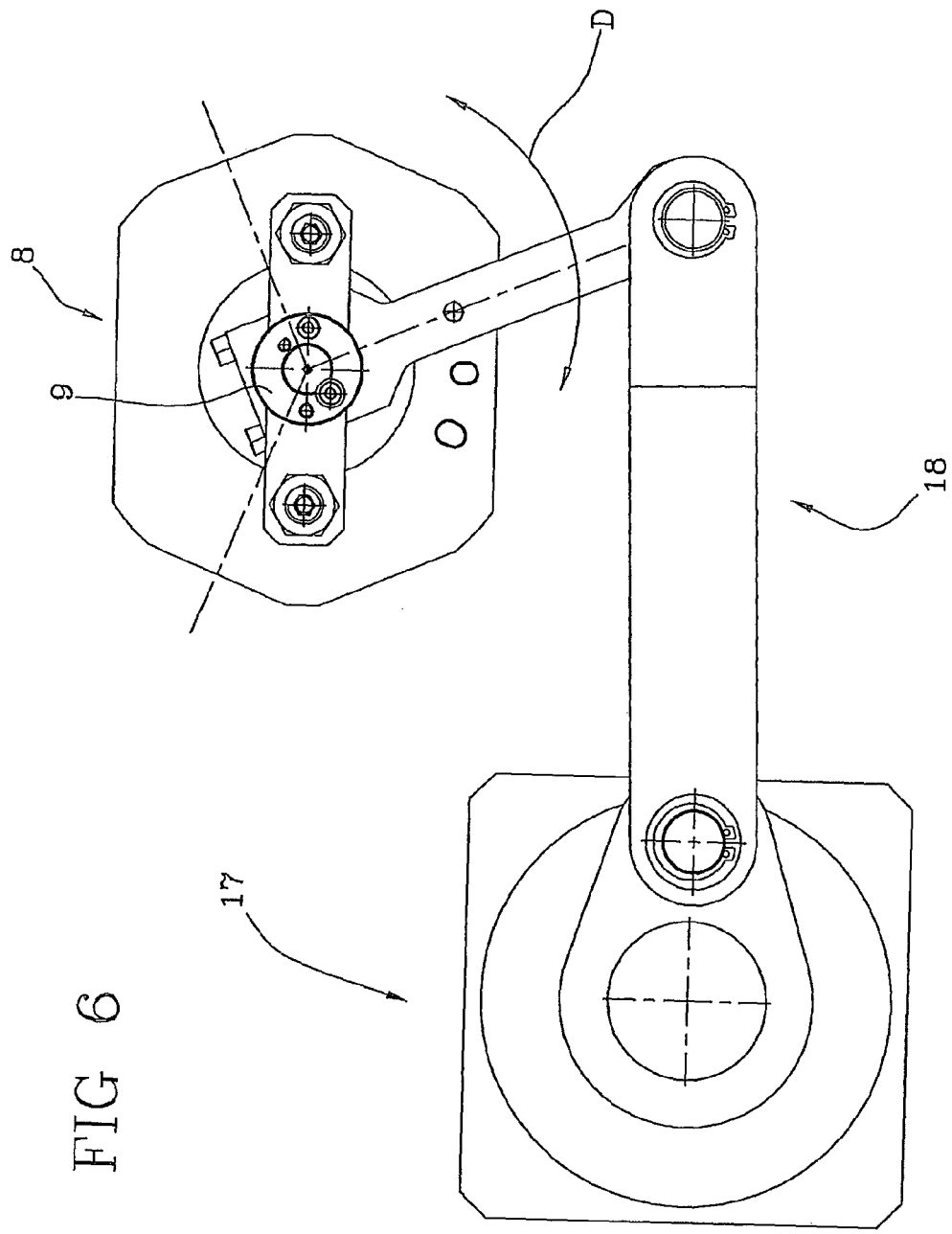
FIG. 6 is a plan view of the extrusion device of FIG. 1 in which a respective movement actuator is better illustrated.

Advantageously, in the first operating condition of the selection element 8 groove 11 is disposed in fluid communication with the first duct 5 and with nozzle 2a to allow passage of the first plastic material M1 (FIGS. 1, 1a and 4). In the second operating condition of the selection element 8, groove 11 is on the contrary positioned in fluid communication with the second duct 6 and with nozzle 2a to enable passage of the second plastic material M2 (FIGS. 2, 2a and 5).

It should be also noted that the outer wall 10 of the cylindrical body has at least one surface portion 12 disposed near groove 11. The surface portion 12 has a substantially arched conformation and is adapted to obstruct one of the two ducts 5, 6 during delivery of one of the two materials M1 and M2.

In particular, in the first operating condition of the selection element 8, the surface portion 12 abuts against the outlet of the second duct 6 in cavity 4, to inhibit passage of the second material M2 towards the ejection nozzle 2a. Under this situation, groove 11 is placed at the first duct 5 to enable feeding of the first material M1 alone.

Likewise, in the second operating condition of the selection element 8, the surface portion 12 abuts against the outlet of the first duct 5 in cavity 4, to inhibit passage of the first material M1 to the ejection nozzle 2a. In this situation groove 11 is placed at the second duct 6 to enable feeding of the second material M2 alone.

Preferably, according to the accompanying drawings, the shared end portion 7 has a plurality of grooves 11 formed in the outer wall 10 of the cylindrical body 9. These grooves 11 are suitably spaced apart from each other by respective surface portions 12. In this manner, grooves 11 are alternated with respective surface portions 12.

Grooves 11 further have respective inlet regions 13 of the material that are coincident with a corresponding duct 5, 6. On the opposite side from the inlet region 13 a common outlet region 14 of the material extends, said region 14 having a circular outline and defining the ejection nozzle 2a.

The common region 14 therefore defines the tubular outline of the materials M1 and M2 that are extruded from nozzle 2a thus obtaining the tubular product P (FIGS. 4 and 5).

In addition, body 9 internally has an air blowing-in channel 16 suitably connected to an air diffuser (not shown or described as of known type and not being part of the present invention) to distribute air within the product P as the latter is being obtained. In this manner the product P is formed while maintaining its inner cavity that determines its tubular outline.

Note that grooves 1 extend along the longitudinal axis X of the cylindrical body 9 so that they can be positioned close to ducts 5 and 6 by rotation of said body 9. Alternatively, by suitably shaping grooves 11, it is possible to cause translation of body 9 so as to define said operating conditions.

With reference to FIGS. 1a, 2a, 4 and 5, it should be pointed out that each duct 5, 6 has a series of branches 15a, 15b disposed along a circumferential path and facing the common stretch 7 (FIGS. 1a and 2a). Branches 15a of the first duct 5 are alternated with branches 15b of the second duct 6 to selectively face a respective groove 11 or a respective surface portion 12.

As viewed from FIGS. 4 and 5 in which the path followed by materials M1 and M2 is shown when the grooves are at the branches 15a of the first duct 5, the first material M1 is caused to flow to nozzle 2a while the second material M2 is stopped by the surface portions 12. When, on the contrary, grooves 11 are at the branches 15b of the second duct 6, the second material M2 is caused to flow to nozzle 2a while the first material M1 is stopped by the surface portions 12.

Rotation of body 9 disposing grooves 11 and surface portions 12 in front of ducts 5, 6 is governed by an actuator 17, such as an electric motor of known type.

Actuator 17 is associated with the cylindrical body 9 on the opposite side relative to said end 9a for rotating body 9 around the respective longitudinal axis X between the first and second operating conditions. Preferably, actuator 17 is coupled to body 9 by a crank-connecting rod drive member 18 adapted to rotate the cylindrical body 9 in a reciprocating manner along the direction D. Advantageously, due to alternation of the angular position of grooves 11 and portions 12, the first and second materials M1, M2 are alternately extruded, thus defining a single extruded body P of composite material.

It is also an object of the present invention, in agreement with the hitherto described and hereinafter claimed "plant" features, to provide a corresponding method of extruding composite objects with at least one first material (M1) and a second material (M2), which method comprises the following steps:

first of all feeding of a first plastic material M1 through a first duct 5 to an ejection nozzle 2a of an extrusion head 2 is carried out, and also feeding, of a second plastic material M2 through a second duct 6 to the same ejection nozzle 2a of the same extrusion head 2 is carried out; and advantageously a suitable selection element 8 disposed close to the ejection nozzle 2a is switched over to the following conditions:

a first operating condition in which the selection element 8 obstructs the second duct 6 and simultaneously opens the first duct 5 to enable feeding of the first plastic material M1 through the first duct and simultaneously inhibit feeding of the second plastic material M2 through the second duct 6; and a second operating condition in which the selection element 8 obstructs the first duct 5 and simultaneously opens the second duct 6 to enable feeding of the second plastic material M2 through the second duct 6 and simultaneously inhibit feeding of the first plastic material M1 through the second duct 5.

The sequence of the above listed operating conditions conveniently enables a single extruded body P to be obtained which is divided into a plurality of segments connected to each other (typically without a break, since on occurrence of the switching over operation the two materials have sufficient time to bind to each other) and individually made up of the first material M1 or the second material M2 along an extrusion axis.

The illustrated method in its general steps can be enriched with additional operating stages that can also be carried out in other methods of plant control not necessarily connected with the present invention: in particular these additional operating stages can relate to a method of extruding plastic materials in which the distribution pressure of the first and second materials M1, M2 is controlled for maintaining the delivery pressure of the materials M1, M2 themselves constant.

A possible embodiment of the method (in addition to or as an alternative to the present invention) hereabove described is directed to obtaining a constant outer diameter of the product P. During the material change also the pressure of the plastic mass is adjusted.

It is therefore used a software which keeps the material M1, M2 that is not under production "stationary" to a constant pressure value (the value corresponding to the working pressure of the opposite extruder), which value is modifiable through offset; during and after the exchange the speed of the extruder's body 9 varies according to a predetermined profile being then stabilised to a constant speed until the following exchange where the body 9 will decelerate according to a predetermined profile until "stopping" to a constant pressure (of the opposite extruder). Therefore the software carries out managing of the waiting, starting, working, and stopping profile of each individual extruder and the duration of the exchange speed.

The exchange speed of the valve is managed as a function of each individual extruder (the exchange speed of the valve can be different depending on which extruder has to intervene). The exchange pulse is given as a function of the length of the product to be obtained.

Displayed on the computer is the speed profile of the screw, the outer diameter of the obtained product with display of the value of the required tolerances and the pressure of each individual extruder. These courses can be seen individually or superposed on each other.

Advantageously, the selection element 8 close to nozzle 2a allows the overall bulkiness of device 1 to be limited giving rise to a particularly simple structure.

This advantage is given by the fact that grooves 11 are positioned at the ejection nozzle 2a and therefore a common stretch 7 is defined that does not allow formation of possible unfed material residues.

In addition, a single movable element is used for alternating feeding of the first or the second materials M1, M2. As a result, synchronisation apparatuses and related on-off valves for the material feeding are not used.

In addition, the managing software allows flow resistances to be avoided during delivery of the material, thereby maintaining a constant feeding of the two materials that are extruded in a homogeneous manner.

The invention claimed is:

1. An extrusion device, in particular for plastic materials, comprising:

an extrusion head having a nozzle for ejection of at least one plastic material;

a first duct formed in said head for feeding a first plastic material to said ejection nozzle; and a second duct formed in said head for feeding a second plastic material to said ejection nozzle;

a selection element, disposed in the vicinity of said ejection nozzle and suitable for carrying out switching between a first operating condition at which it closes the second duct to enable feeding of the first plastic material through the first duct, and a second operating condition at which it closes the first duct for enabling feeding of the second plastic material through the second duct;

said selection element comprising a substantially cylindrical body rotatably inserted in a cavity of the extrusion head and an actuator operatively associated with said cylindrical body for rotation of said body about a respective longitudinal axis between the first and second operating conditions; and a common end stretch of said first and second ducts located in the vicinity of said election nozzle and formed in said selection element, said common end stretch being defined by at least one groove formed in an outer wall of said cylindrical body, at a respective end close to the ejection nozzle.

2. A device as claimed in claim 1. characterised in that said actuator rotates the cylindrical body in a reciprocating motion for alternately extruding the first and second materials, thus defining a single extruded body of composite material.

3. A device as claimed in claim 1, characterised in that in the first operating condition of the selection element, the groove is brought into fluid communication with the first duct and said nozzle, and in the second operating condition of the selection element the groove is brought into fluid communication with the second duct and said nozzle.

4. A device as claimed in claim 3, characterised in that said outer wall of the cylindrical body has a surface portion disposed close to said groove;

said surface portion obstructing the second duct in the first operating condition of the selection element to inhibit passage of the second material to the ejection nozzle, and obstructing the first duct in the second operating condition of the selection element to inhibit passage of the first material to the ejection nozzle.

5. A device as claimed in claim 4, characterised in that said common end stretch comprises a plurality of grooves formed in the outer wall of the cylindrical body and spaced apart from each other by respective inlet regions of the material that are coincident with a corresponding duct and a common outlet region of the material having a circular profile and defining said ejection nozzle.

6. A device as claimed in claim 5, characterised in that each duct has a series of branches disposed along a circumferential path and turned towards said common stretch; the branches of the first duct being alternated with the branches of the second duct for selectively facing a respective groove or a respective surface portion.

* * * * *